US010839315B2

(12) United States Patent
Bezzubtseva et al.

(10) Patent No.: US 10,839,315 B2
(45) Date of Patent: Nov. 17, 2020

(54) METHOD AND SYSTEM OF SELECTING TRAINING FEATURES FOR A MACHINE LEARNING ALGORITHM

(71) Applicant: YANDEX EUROPE AG, Lucerne (CH)

(72) Inventors: Anastasiya Aleksandrovna Bezzubtseva, Lipetsk (RU); Alexandr Leonidovich Shishkin, Kirovo-Chepetsk (RU); Gleb Gennadievich Gusev, Moscow (RU); Aleksey Valyerevich Drutsa, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 842 days.

(21) Appl. No.: 15/607,718

(22) Filed: May 30, 2017

(65) Prior Publication Data

US 2018/0039911 A1    Feb. 8, 2018

(30) Foreign Application Priority Data

Aug. 5, 2016    (RU) .............................. 2016132425

(51) Int. Cl.
*G06N 20/00* (2019.01)
*G06F 16/93* (2019.01)
(Continued)

(52) U.S. Cl.
CPC ............ *G06N 20/00* (2019.01); *G06F 16/93* (2019.01); *G06F 16/24578* (2019.01); *G06F 16/334* (2019.01); *G06F 16/90335* (2019.01)

(58) Field of Classification Search
CPC .......... G06N 20/00; G06N 3/08; G06F 16/93; G06F 16/334; G06F 16/24578;
(Continued)

(56) References Cited

U.S. PATENT DOCUMENTS 6,480,621 B1 * 11/2002 Lyon ........................ G06N 3/08
382/157
7,219,085 B2    5/2007 Buck et al.
(Continued)

FOREIGN PATENT DOCUMENTS

EA    200400068 A1    6/2005
RU    2542937 C2    2/2015
(Continued)

OTHER PUBLICATIONS

Vergara, "A review of feature selection methods based on mutual information", Mar. 13, 2013, pp. 175-186 (Year: 2013).*
(Continued)

*Primary Examiner* — Vincent Gonzales
*Assistant Examiner* — Imad Kassim
(74) *Attorney, Agent, or Firm* — BCF LLP

(57) ABSTRACT

Methods and systems for selecting a selected-sub-set of features from a plurality of features for training a machine learning module, the training of the machine learning module to enable classification of an electronic document to a target label, the plurality of features associated with the electronic document. In one embodiment, the method comprises analyzing a given training document to extract the plurality of features, and for a given not-yet-selected feature of the plurality of features: generating a set of relevance parameters iteratively, generating a set of redundancy parameters iteratively and determining a feature significance score based on the set of relevance parameters and the set of redundancy parameters. The method further comprises selecting a feature associated with a highest value of the feature significance score and adding the selected feature to the selected-sub-set of features.

18 Claims, 5 Drawing Sheets

(51) Int. Cl.
*G06F 16/33* (2019.01)
*G06F 16/2457* (2019.01)
*G06F 16/903* (2019.01)

(58) Field of Classification Search
CPC ...... G06F 16/90335; G06F 16/00; G06F 3/14; G06F 9/44
See application file for complete search history.

(56) References Cited

U.S. PATENT DOCUMENTS

| | | | |
|---|---|---|---|
| 7,324,927 B2 | 1/2008 | Weng et al. | |
| 7,853,599 B2* | 12/2010 | Liu | G06F 16/334 |
| | | | 707/748 |
| 8,108,324 B2 | 1/2012 | Krupka et al. | |
| 10,380,498 B1* | 8/2019 | Chaoji | G06N 20/00 |
| 2005/0169529 A1* | 8/2005 | Owechko | G06K 9/469 |
| | | | 382/190 |
| 2009/0271338 A1* | 10/2009 | Chidlovskii | G06N 20/00 |
| | | | 706/12 |
| 2010/0150448 A1* | 6/2010 | Lecerf | G06K 9/2072 |
| | | | 382/190 |
| 2012/0284791 A1* | 11/2012 | Miller | G06N 7/005 |
| | | | 726/22 |
| 2013/0132311 A1* | 5/2013 | Liu | G06K 9/00718 |
| | | | 706/12 |
| 2014/0156567 A1* | 6/2014 | Scholtes | G06N 5/02 |
| | | | 706/12 |
| 2014/0207764 A1* | 7/2014 | Haws | G06F 16/90335 |
| | | | 707/723 |
| 2014/0207800 A1* | 7/2014 | Haws | G06F 16/24578 |
| | | | 707/749 |
| 2014/0233826 A1* | 8/2014 | Agaian | G16H 30/20 |
| | | | 382/133 |
| 2015/0019204 A1* | 1/2015 | Simard | G06F 3/0482 |
| | | | 704/9 |
| 2015/0278703 A1 | 10/2015 | Liu | |
| 2015/0379166 A1 | 12/2015 | Xin et al. | |
| 2015/0379429 A1* | 12/2015 | Lee | G09B 5/00 |
| | | | 706/11 |
| 2015/0379430 A1* | 12/2015 | Dirac | G06N 20/00 |
| | | | 706/12 |
| 2016/0246775 A1* | 8/2016 | Iwakura | G06F 40/30 |
| 2017/0017899 A1* | 1/2017 | Maor | G06F 16/2456 |
| 2017/0176565 A1* | 6/2017 | Kwak | A61B 5/4381 |
| 2017/0358075 A1* | 12/2017 | Cao | G06T 7/11 |
| 2018/0011854 A1* | 1/2018 | Yi | G06N 20/00 |
| 2018/0011922 A1* | 1/2018 | Sethumadhavan | G06Q 10/04 |

FOREIGN PATENT DOCUMENTS

| | | |
|---|---|---|
| RU | 2583716 C2 | 5/2016 |
| WO | 2011034502 A1 | 3/2011 |

OTHER PUBLICATIONS

Schaffernitch et al., "Forward Feature Selection Using Residual Mutual Information", Proc. 17th European Symposium on Artificial Neural Networks—Advances in Computational Intelligence and Learning (ESANN 2009), pp. 583-588.

Erfanian et al., "Feature Extraction by Mutual Information Based on Minimal-Redundancy-Maximal-Relevance Criterion and Its Application to Classifying EEG Signal for Brain-Computer Interfaces", Iran University of Science and Technology, Recent Advances in Brain-Computer Interface Systems, https://www.intechopen.com/, pp. 67-82.

Search Report with regard to the counterpart RU Application 2016132425 completed Jul. 10, 2017.

English Abstract for EA 200400068 retrieved on Espacenet on Feb. 20, 2018.

\* cited by examiner

METHOD AND SYSTEM OF SELECTING TRAINING FEATURES FOR A MACHINE LEARNING ALGORITHM

CROSS-REFERENCE

The present application claims priority to Russian Patent Application No. 2016132425, filed Aug. 5, 2016, entitled "Method And System Of Selecting Training Features For A Machine Learning Algorithm," the entirety of which is incorporated herein.

Technical Field

The present technology relates to methods and systems for selecting training features for a machine learning algorithm.

Background

The multiplication of connected computing devices coupled with advances in computing power and telecommunication networks has increased the flow of information which in turn requires the storage, transfer, searching, curation and analysis of extensive and complex data sets.

Machine learning and data mining techniques have been devised to study data sets and build models to make predictions to produce reliable, repeatable decisions and results. Classification, a subfield of machine learning, is aimed at solving the problem of identifying to which of a set of categories a new observation belongs. In classification, inputs are divided into two or more classes and the machine learning method has to produce a model that assigns the inputs to one or more of these classes based on a training set of data. The individual observations of data are analyzed into a set of quantifiable properties, known as explanatory variables or features.

Feature selection, also known as variable selection, attribute selection or variable subset selection, is a discipline in machine learning concerned with constructing and selecting a subset of relevant features for use in model construction, which allows simplification of models, requires shorter training times and enhances generalization by reducing overfitting. Feature selection techniques are based on the premise that data may contain redundant or irrelevant features, which may be removed with minimal loss of information. Feature selection is especially important in the context of extensive data sets containing hundreds and thousands of features.

Feature selection methods for classification may have application fields as varied as computer vision, drug discovery and development, geostatistics, speech recognition, biometric identification, biological classification, document classification and pattern recognition, among others. As an example, feature selection can be performed in the context of gene selection, where the features are gene expressions coefficients corresponding to the abundance of mRNA in a sample for a number of patients, and where a classification task is to separate healthy patients from cancer patients, based on their gene expressions coefficients. In such a situation, the classification of a hundred patients may result in the analysis of up to 60,000 variables or features. Another example of application of feature selection may be in text categorization, where documents may be represented by "bag-of-words" vectors of dimension of the size of the vocabulary containing word frequency counts, which may be up to hundreds of thousands of words, and where classification of a document may require the analysis of the hundred of thousand of words. Such documents may then be classified in categories by search engines, or may be used in the context of spam filtering. Therefore, feature selection would allow performing the tasks of classification with fewer variables and with a minimal loss of precision, which may save time and computational resources.

Feature selection methods can be generally grouped into three categories: wrapper methods, embedded methods and filter methods. Wrapper methods use a learning algorithm as a black box to score subsets of variables according to their predictive power. Embedded methods perform variable selection in the process of training and are usually specific to a given learning. Filter methods select subsets of variables as a pre-processing step, independently of the chosen predictor. Filter methods can be particularly appealing for certain tasks because of their speed, their generic selection of variables and their usage as a preprocessing step to reduce space dimensionality and overcome overfitting.

Filter methods usually consider a scoring criterion representing the correlation between a feature and a class label to measure how useful a feature may be when used in a classifier. Several filter methods using maximization of various scoring criterions were developed.

Patent Application No. US 2014/0207764 A1 by Haws et al. teaches various embodiments to select features from a feature space. In one embodiment a set of features and a class value are received. A redundancy score is obtained for a feature that was previously selected from the set of features. A redundancy score is determined, for each of a plurality of not-yet-selected features in the set of features, based on the redundancy score that has been obtained, and a redundancy between the not-yet-selected feature and the feature that was previously selected. A relevance to the class value is determined for each of the not-yet-selected features. A feature from the plurality of not-yet-selected features with a highest relevance to the class value and a lowest redundancy score is selected.

U.S. Pat. No. 7,853,599 B2 by Liu et al. teaches various exemplary methods, computer program products, and systems for selecting features for ranking in information retrieval. The disclosure describes calculating importance scores for features, measuring similarity scores between two features, selecting features that maximizes total importance scores of the features and minimizes total similarity scores between the features. Also, the disclosure includes selecting features for ranking that solves an optimization problem. Thus, the disclosure identifies relevant features by removing noisy and redundant features and speeds up a process of model training.

SUMMARY

It is an object of the present technology to ameliorate at least some of the inconvenience present in the prior art.

Embodiments of the present technology have been developed based on developers' appreciation of at least one technical problem associated with the prior art solutions.

Without wishing to be bound by any specific theory, developers of the present technology believe that the traditional approaches to feature selection with mutual information (MI) may not consider or be efficient when interaction of more than three features is contemplated. Additionally, these approaches may not consider features that are relevant together but not as relevant individually to a target label while also taking into account the redundancy between features using a conditional mutual information.

Moreover, developers of the present technology believe that the traditional approaches to feature selection may not consider the usage of binary representatives for features, which may allow taking into account the interaction of multiple features.

Hence, developers of the present technology address the above-discussed drawbacks associated with the traditional approaches to feature selection by developing a feature selection method using conditional mutual information and taking into account a synergy and a redundancy between a plurality of features. As such, embodiments of the present technology are aimed at generating a subset of features best representing features of a training document to enable the classification of the training document to a target label. The feature selection method may also use binary representatives of features instead of the features.

In accordance with a first broad aspect of the present technology, there is provided a computer-implemented method for selecting a selected-sub-set of features from a plurality of features for training a machine learning module, the machine learning module executable by an electronic device, the training of machine learning module to enable classification of an electronic document to a target label, the plurality of features associated with the electronic document, the method executable by the electronic device, the method comprising: analyzing, by the electronic device, a given training document to extract the plurality of features associated therewith, the given training document having a pre-assigned target label, generating a set of relevance parameters by, for a given not-yet-selected feature of the plurality of features, iteratively executing: determining, by the electronic device, a respective relevance parameter of the given not-yet-selected feature to the pre-assigned target label, the relevance parameter indicative of a level of synergy of the given not-yet-selected feature, together with the set of relevance parameters including one or more already-selected features of the plurality of features, to determination of the pre-assigned target label, adding, by the electronic device, the respective relevance parameter to the set of relevance parameters, generating a set of redundancy parameters by, for the given not-yet-selected feature of the plurality of features, iteratively executing: determining, by the electronic device, a respective redundancy parameter of the given not-yet-selected feature to the pre-assigned target label, the redundancy parameter indicative of a level of redundancy of the given not-yet-selected feature, together with a sub-set of relevance parameters and the set of redundancy parameters, including one or more already-selected features of the plurality of features to determination of the pre-assigned target label, adding, by the electronic device, the respective redundancy parameter to the set of redundancy parameters, analyzing, by the electronic device, the given not-yet-selected feature to determine a feature significance score based on the set of relevance parameters and the set of redundancy parameters, selecting, by the electronic device, a given selected feature, the given selected feature associated with a highest value of the feature significance score and adding the given selected feature to the selected-sub-set of features, and storing, by the machine learning module, the selected-sub-set of features.

In some implementations, the method further comprises after the analyzing, by the electronic device, the given training document to extract the plurality of features associated therewith, binarizing the plurality of features and using a set of binarized features as the plurality of features.

In some implementations, the selected-sub-set of features comprises a pre-determined number of k selected features and wherein the generating the set of relevance parameters iteratively, the generating the set of redundancy parameters iteratively, the analyzing the given not-yet-selected features and selecting the given selected feature is repeated for a total of k times.

In some implementations, the method further comprises, prior to generating the set of relevance parameters, determining a parameter t specifying a number of interacting features, and wherein the determining the respective relevance parameter is iteratively executed for t−1 steps, and wherein the determining the respective redundancy parameters is iteratively executed for t steps.

In some implementations, the parameter t is at least 3.

In some implementations, the respective relevance parameter is determined based on:

$$h_j := \operatorname{argmax} I(c, b | h_1, \ldots, h_{j-1}, h)$$

wherein I is a mutual information, wherein c is the pre-assigned target label, and wherein b is the given not-yet-selected feature.

In some implementations, the respective redundancy parameter is determined based on:

$$g_j := \operatorname{argmin} I(c, b, h_1, \ldots, h_{j-1} | g_1, \ldots, g_{j-1}, g)$$

wherein I is the mutual information, wherein c is the pre-assigned target label, wherein b is the given not-yet-selected feature, and wherein $h_1, \ldots h_{j-1}$ is the sub-set of relevance parameters.

In some implementations, the analyzing, by the electronic device, the given not-yet-selected feature to determine the feature significance score based on the sub-set of relevance parameters and the sub-set of redundancy parameters is determined based on:

$$J_i[f] := \max_{b \in B[f]} I(c, b, h_1, \ldots, h_{t-1} | g_1, \ldots, g_t)$$

wherein $J_i$ is the feature significance score, wherein b is the given unselected binarized feature, wherein B[f] is the set of binarized features, wherein I is the mutual information, wherein c is the pre-assigned target label, wherein $h_1, \ldots, h_{t-1}$ is the set of relevance parameters, and wherein $g_1, \ldots, g_t$ is the set of redundancy parameters.

In some implementations, the given selected feature associated with a highest value of the feature significance score is determined based on:

$$f_{best} := \operatorname{argmax}_{f \in F \setminus S} J_i[f]$$

wherein f is a given selected feature of the plurality of features, and wherein F\S is a set of not-yet-selected features.

In some implementations, the method further comprises, prior to generating the second set of relevance parameters: analyzing, by the electronic device, each feature of the plurality of features, to determine an individual relevance parameter of a given feature of the plurality of features to the pre-assigned target label, the individual relevance parameter indicative of a degree of relevance of the given feature to the determination of the pre-assigned target label, and selecting, by the electronic device, from the plurality of features a first selected feature, the first selected feature associated with a highest value of the individual relevance parameter and adding the first selected feature to the selected-sub-set of features.

In some implementations, the individual relevance parameter is determined based on $$f_{best} := \mathrm{argmax}_{f \in F} \max_{b \in B[f]} I(c, b)$$

wherein f is the given feature of the plurality of features, wherein F is the plurality of features, wherein I is the mutual information, wherein c is the pre-assigned target label, wherein b is the given feature, and wherein B [f] is the set of binarized features.

In some implementations, the generating the respective relevance parameter is further based on the plurality of features and wherein the generating the respective redundancy parameter is based on the selected-sub-set of features.

In some implementations, adding the given selected feature to the selected-sub-set of features comprises adding the set of relevance parameters to the selected-sub-set of features.

In accordance with a second broad aspect of the present technology, there is provided a server for selecting a selected-sub-set of features from a plurality of features for training a machine learning module, the training of the machine learning module to enable classification of an electronic document to a target label, the plurality of features associated with the electronic document, the server comprising: a memory storage, a processor coupled to the memory storage, the processor configured to: analyze a given training document to extract the plurality of features associated therewith, the given training document having a pre-assigned target label, generate a set of relevance parameters by, for a given not-yet-selected feature of the plurality of features, iteratively executing: determine a respective relevance parameter of the given not-yet-selected feature to the pre-assigned target label, the relevance parameter indicative of a level of synergy of the given not-yet-selected feature, together with the set of relevance parameters including one or more already-selected features of the plurality of features, to determination of the pre-assigned target label, add the respective relevance parameter to the set of relevance parameters, generate a set of redundancy parameters by, for the given not-yet-selected feature of the plurality of features, iteratively executing: determine a respective redundancy parameter of the given not-yet-selected feature to the pre-assigned target label, the redundancy parameter indicative of a level of redundancy of the given not-yet-selected feature, together with a sub-set of relevance parameters and the set of redundancy parameters, including one or more already-selected features of the plurality of features to determination of the pre-assigned target label, add the respective redundancy parameter to the set of redundancy parameters, analyze the given not-yet-selected feature determine a feature significance score based on the set of relevance parameters and the set of redundancy parameters, select a given selected feature, the given selected feature associated with a highest value of the feature significance score and adding the given selected feature to the selected-sub-set of features, and store, at the memory storage, the selected-sub-set of features.

In some implementations, the processor is further configured to, after analyzing the given training document to extract a plurality of features associated therewith, the given training document having a pre-assigned target label, binarize the plurality of features and use a set of binarized features as the plurality of features.

In some implementations, the selected-sub-set of features comprises a pre-determined number of k selected features and wherein the generating the set of relevance parameters iteratively, the generating the set of redundancy parameters iteratively, the analyzing the given not-yet-selected features and selecting the given selected feature is repeated for a total of k times.

In some implementations, the processor is further configured to, prior to generating the set of relevance parameters, determine a parameter t specifying a number of interacting features, and wherein the determining the respective relevance parameter is iteratively executed for t−1 steps, and wherein the determining the respective redundancy parameters is iteratively executed for t steps.

In some implementations, the parameter t is superior to 3.

In some implementations, the respective relevance parameter is determined based on:

$$h_j := \mathrm{argmax}\, I(c, b | h_1, \ldots, h_{j-1}, h)$$

wherein I is a mutual information, wherein c is the pre-assigned target label, and wherein b is the given not-yet-selected feature.

In some implementations, the respective redundancy parameter is determined based on:

$$g_j := \mathrm{argmin}\, I(c, b, h_1, \ldots, h_{j-1} | g_1, \ldots, g_{j-1}, g)$$

wherein I is the mutual information, wherein c is the pre-assigned target label, wherein b is the given not-yet-selected feature, and wherein $h_1, \ldots h_{j-1}$ is the sub-set of relevance parameters.

In some implementations, the analyzing the given not-yet-selected feature to determine the score based on the set of relevance parameters and the set of redundancy parameters is determined based on:

$$J_t[f] := \max_{b \in B[f]} I(c, b, h_1, \ldots, h_{t-1} | g_1, \ldots, g_t)$$

wherein $J_t$ is the score, wherein b is the binarized given not-yet-selected feature, wherein B[f] is the set of binarized features, wherein I is the mutual information, wherein c is the pre-assigned target label, wherein $h_1, \ldots, h_{t-1}$ is the set of relevance parameters, and wherein $g_i, \ldots, g_t$ is the set of redundancy parameters.

In some implementations, the given selected feature associated with a highest value of the feature significance score is determined based on:

$$f_{best} := \mathrm{argmax}_{f \in F \backslash S} J_t[f]$$

wherein f is a given feature of the plurality of features, and wherein F\S is a set of not-yet-selected features.

In some implementations, the processor is further configured to, prior to the selecting the second set of relevance parameters: analyze each feature of the plurality of features, to determine an individual relevance parameter of a given feature of the plurality of features to the pre-assigned target label, the individual relevance parameter indicative of a degree of relevance of the given feature to the determination of the pre-assigned target label, and select from the plurality of features a first selected feature, the first selected feature associated with a highest value of the individual relevance parameter and adding the first selected feature to the selected-sub-set of features.

In some implementations, the individual relevance parameter is determined based on:

$$f_{best} := \mathrm{argmax}_{f \in F} \max_{b \in B[f]} I(c, b)$$

wherein f is a feature of the plurality of features, wherein F is the plurality of features, wherein I is the mutual information, wherein c is the pre-assigned target label, wherein b is the given not-yet-selected feature, and wherein B[f] is the set of binarized features.

In some implementations, the generating the respective relevance parameter is further based on the plurality of features and wherein the generating the respective redundancy parameter is based on the selected-sub-set of features.

In some implementations, adding the given selected feature to the selected-sub-set of features comprises adding the set of relevance parameters to the selected-sub-set of features.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, unless expressly provided otherwise, the expression "computer-readable medium" and "storage" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, reference is made to a "mutual information". The mutual information (MI) is a measure of the amount of information that one random variable has about another random variable and may be interpreted as how closely the variables are related. The MI may be expressed as $$I(f;g)=H(f)+H(g)-H(f,g) \quad \text{(EQ. 1)}$$

where $H(f)=-E[\log P(f)]$ is Shannon's entropy and h and g are two random variables. The conditional information of two random variables h and g given the variable h may be expressed as:

$$I(f;g|h)=I(f;g,h)-I(f;h) \quad \text{(EQ. 2)}$$

The conditional mutual information measures how much additional amount of information about the variable f is carried by the variable g compared to the variable h.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION OF THE DRAWINGS

Figure 1:
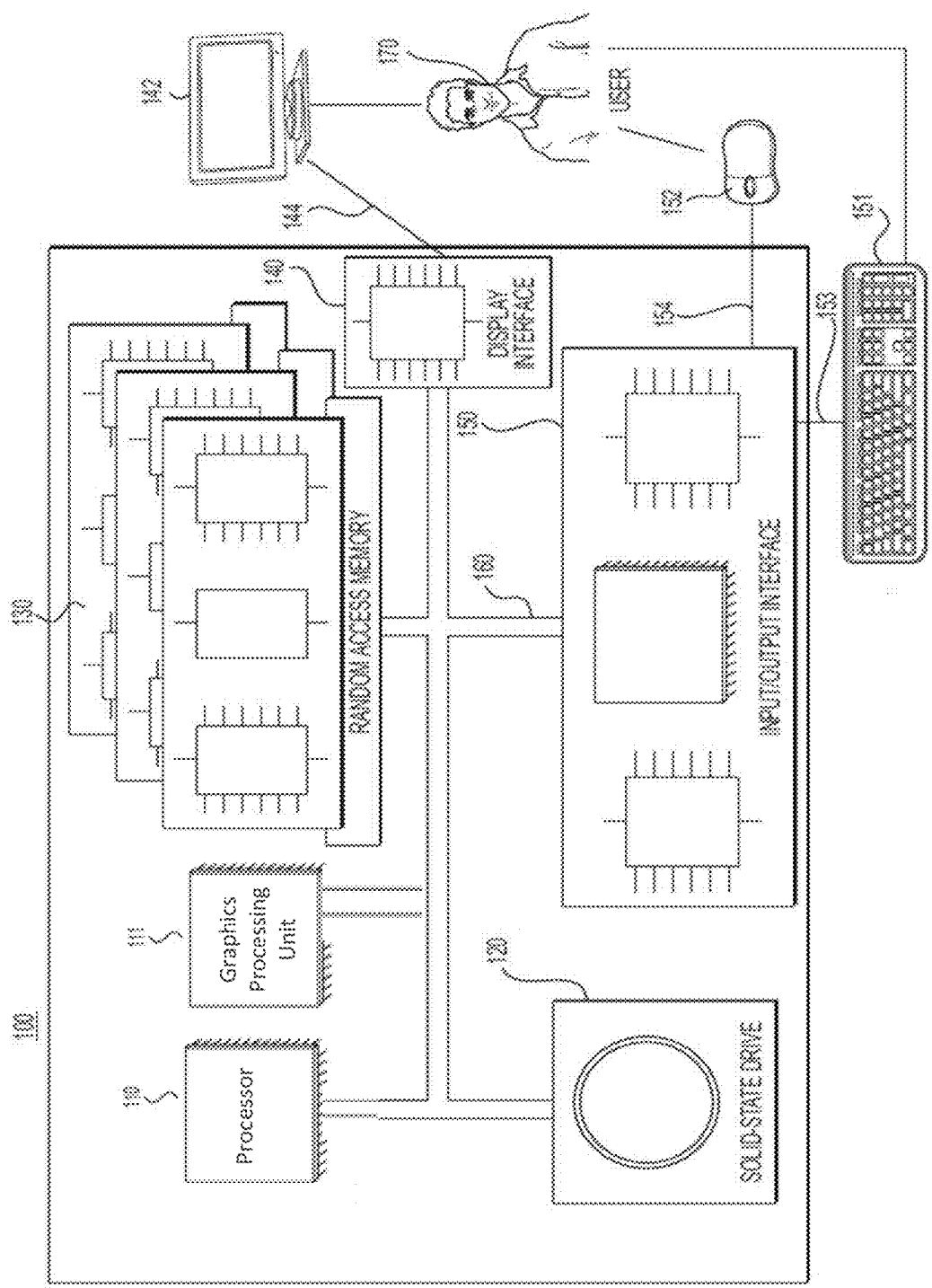
FIG. 1 is a diagram of an electronic device for implementing the present technology and/or being used in conjunction with implementations of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for selecting a selected-sub-set of features from a plurality of features. For example, the program instructions may be part of a library or an application.

The electronic device 100 may be a server, a desktop computer, a laptop computer, a tablet, a smartphone, a personal digital assistant or any device that may be configured to implement the present technology, as it may be understood by a person skilled in the art.

Figure 2:
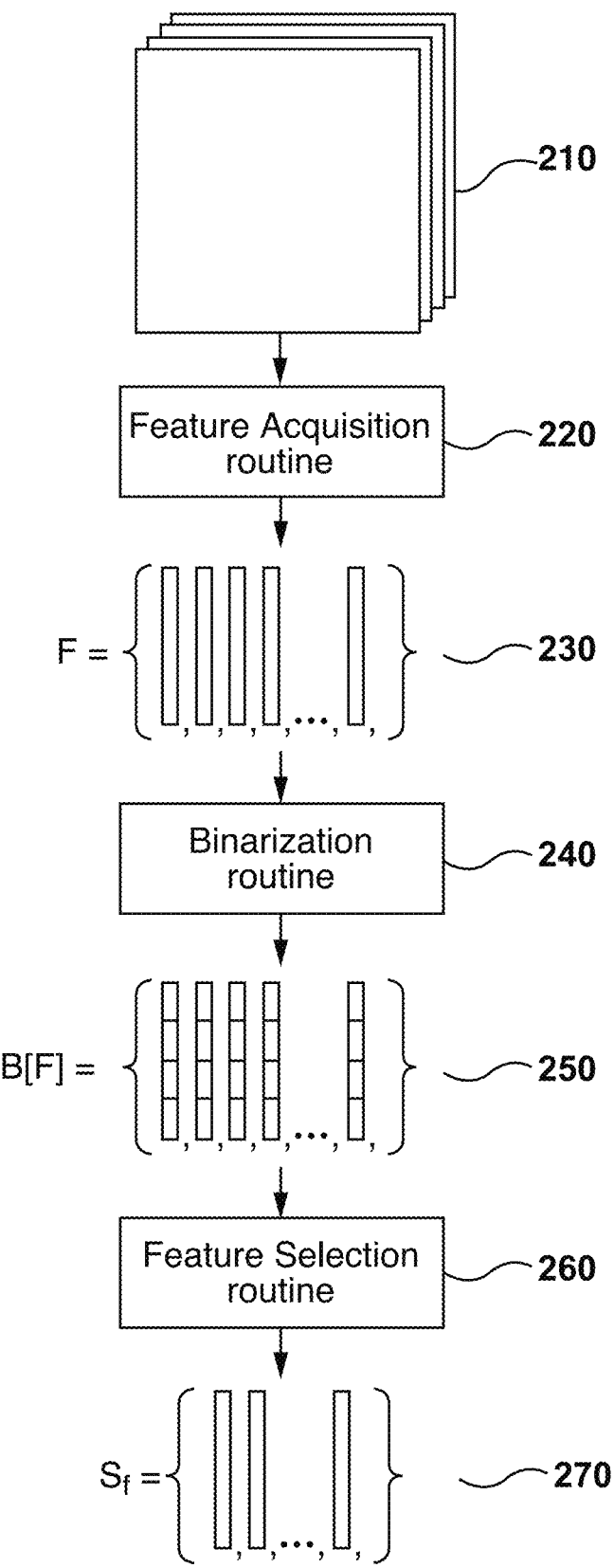
FIG. 2 depicts a schematic representation of a feature selection block wherein the processing is executed by the electronic device as contemplated in some implementations of the present technology.

Turning now to FIG. 2, there is shown an illustrative example of feature selection block 200.

The feature selection block 200 may be executed by the electronic device 100 and may include a feature acquisition routine 220, a binarization routine 240, and a feature selection routine 260 processing a training document 210.

The training document 210 may be any form of electronic file or document that can be stored on a computer readable medium such as, but not limited to, the solid-state drive 120. As it will be recognized by the person skilled in the art, the implementation of the training document 210 is not limited. The training document 210 may include any type of media or data, and may be text, an HTML page, a PDF document, formatting information, metadata, audio recording, an image or a video recording. In some embodiments, the training document 210 may be acquired via a communication network (not depicted) from a server (not depicted). In other embodiments, the training document 210 may be acquired from multiple sources or servers (not depicted), or uploaded or typed the user 170.

The feature acquisition routine 220 may be used to acquire a plurality of features 230 and a pre-assigned target label (not depicted) from the training document 210. The feature acquisition routine 220 may output the plurality of features 230 and the associated pre-assigned target label (not depicted) of the training document 210 in the form of one or more vectors. In some embodiments, the plurality of features 230 may already have been extracted, analyzed and/or filtered in a previous step (not depicted) by the electronic device 100 or by another electronic device (not depicted), and contain the plurality of features 230 and the associated target label typically assigned by an assessor. In other embodiments, the feature acquisition routine 220 may extract the plurality of features 230 from raw data by methods such as independent component analysis, isomap, kernel pca, latent semantic analysis, partial least squares, principal component analysis, multifactor dimensionality reduction, nonlinear dimensionality reduction, multilinear principal component analysis, multilinear subspace learning, semidefinite embedding, autoencoder or deep feature synthesis. In other embodiments, where the training document 210 is an image, the feature acquisition routine 220 may use methods including Histogram of Oriented Gradients (HOG), Speeded Up Robust Features (SURF), Local Binary Patterns (LBP), Haar wavelets, and color histograms. In other embodiments, the feature acquisition routine 220 may use a custom method to extract the plurality of features 230 from the training document 210, depending on how the training document 210 is implemented.

The plurality of features 230 may be represented in the form of a vector or multidimensional vector, and may be a numerical representation of the features of the training document 210.

The binarization routine 240 may be used to perform a binary transformation of the plurality of features 230 to ouput a set of binarized features 250. A given feature of the set of binarized features 250 may contain the same information as the same feature from the plurality of features 230, in the form of vectors with 0's and 1's. In some embodiments, the pre-assigned target label may also be binarized. Generally, feature selection methods based on calculation of a mutual information (MI) of more than three features imply a large dimension of their joint distribution, which requires a large number of instances to estimate the MI, which in turn may be computationally expensive. As an example, if each feature in the plurality of features 230 has d values, the dimension of the joint distribution of a scoring function where interaction of t features is taken into account may be $2 \cdot d^{2t}$ (e.g. $\approx 4.9 \cdot 10^8$ for t=6 and d=5). The binary transformation allows to reduce the dimension of the joint distribution to $2 \cdot 2^{2t}$ (e.g. $\approx 8.2 \cdot 10^3$ for t=6 and d=5). In some embodiments, the binarization routine 240 may be executed at different times during the feature selection routine 260. The binarization routine 240 may be optional, and may not be executed in every embodiment of the present technology.

The feature selection routine 260 may be used to compute and output a selected-sub-set of features 270 from the set of binarized features 250. A more detailed description of the feature selection routine 260 is provided below.

Figure 3:
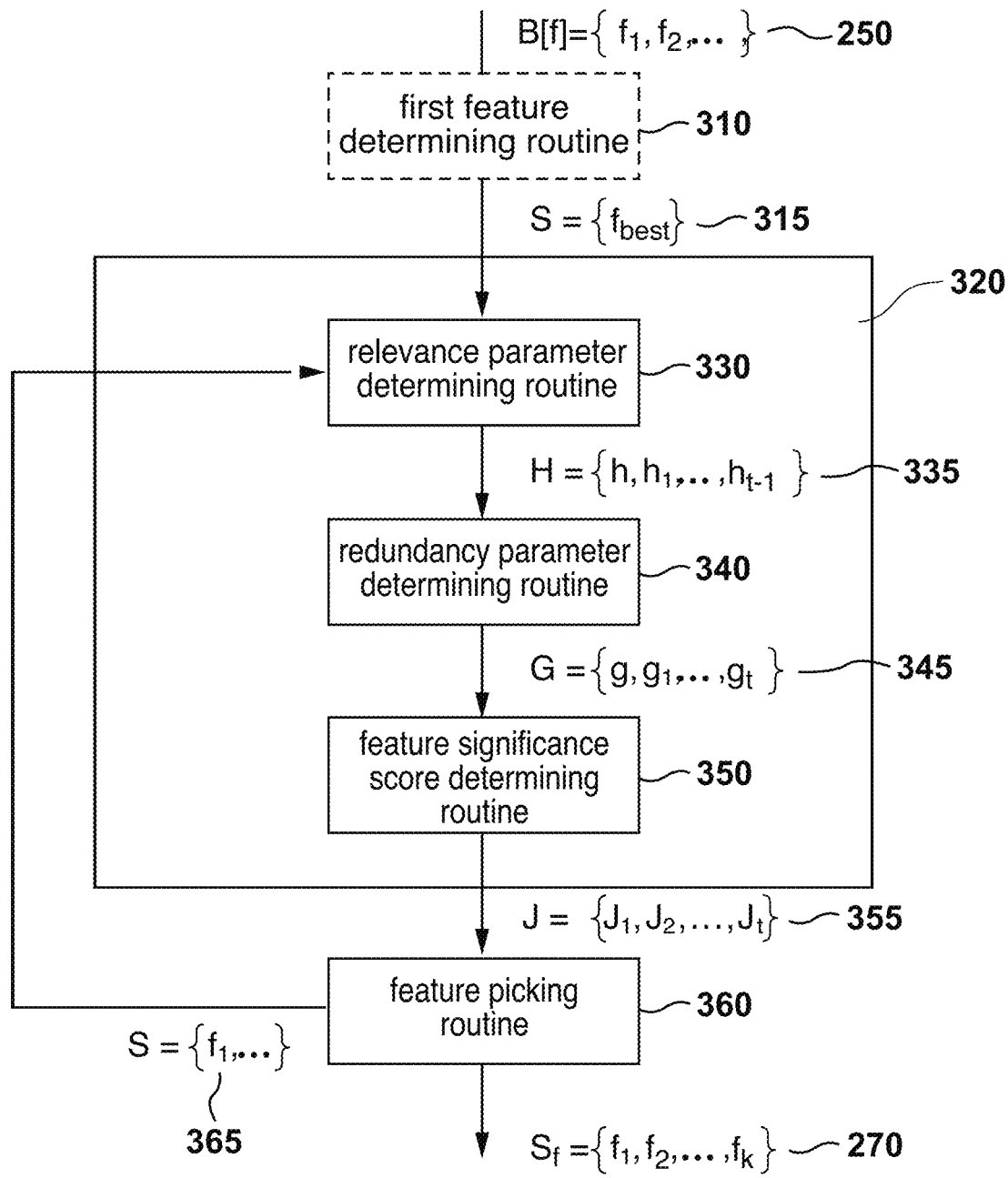
FIG. 3 depicts a schematic representation of a feature selection determining routine as contemplated in some implementations of the present technology.

Turning now to FIG. 3, there is shown an illustrative example of a feature selection routine 260. The feature selection routine 260 may comprise an optional first feature determining routine 310, an iterative routine 320, and a feature picking routine 360. The iterative routine 320 may comprise a relevance parameter determining routine 330, a redundancy parameter determining routine 340 and a feature significance score determining routine 350. The feature selection routine 260 may be used to select and output the selected-sub-set of features 270 from the plurality of features 230 or the set of binarized features 250.

The feature selection routine 260 may take as an input the plurality of features 230, a pre-assigned target label (not depicted), a number of features to be selected (not depicted) and an interaction parameter (not depicted), the interaction parameter specifying the number of features to be considered when determining the conditional mutual information of the relevance parameter and the redundancy parameter. In some embodiments, the input may go to the first feature determining routine 310. In other embodiments, the input may go directly to the relevance determining routine 330. In the embodiments recited herein, the feature selection routine 260 takes as an input the set of binarized features 250, however it may be replaced by the plurality of features 230 without any changes to the feature selection routine 260.

In some embodiments, the feature selection routine 260 may comprise a first feature determining routine 310, for selecting a given feature having a highest degree of relevance to the determination of the pre-assigned target label is selected. The given feature may be selected by computing the MI of every feature from the set of binarized features 250 with the pre-assigned target label. The feature with the highest value of an individual relevance parameter, which is the maximal argument of the maximum of the MI, may then be selected as the first selected feature. The first feature may then be added to a selected-sub-set of features 315. The first selected feature may be determined based on:

$$f_{best} := \operatorname{argmax}_{f \in F} \max_{b \in B[f]} I(c;b) \quad \text{(EQ. 3)}$$

wherein f is the given feature of the set of features, wherein F is the plurality of features 230, wherein b is the binarized given feature, wherein B[f] is the binarized set of features, wherein I is the mutual information, and wherein c is the pre-assigned target label. The first selected feature may be added to a selected-sub-set of features 315.

The iterative routine 320 may comprise the relevance parameter determining routine 330, the redundancy parameter determining routine 340 and the feature significance score determining routine 350. Generally, the iterative routine 320 may be executed by the electronic device 100 for a given not-yet-selected feature of the set of binarized features 250, which may go through the relevance parameter determining routine 330, the redundancy parameter determining routine 340 and the feature significance score determining routine 350. In some embodiments, the relevance parameter determining routine 330, the redundancy parameter determining routine 340 and the feature significance score determining routine 350 may all be executed at the same time for each given not-yet-selected feature of the set of binarized features 250, by one or more instances of the electronic device 100 or by one or more electronic devices (not depicted).

The relevance parameter determining routine 330 may be used to generate a set of relevance parameters 335 in a greedy manner for each not-yet-selected feature of the set of binarized features 250. Feature relevance, also known as feature complementariness, synergy or interaction, is a measure of the features that provide a higher relevance to the pre-assigned target label together than when taken individually. The relevance parameter determining routine 320 may take as an input the pre-assigned target label (not depicted) and the set of binarized features 250. In embodiments where a first selected feature was added to the selected-sub-set of features 315, the relevance parameter determining routine 320 may also take the selected-sub-set of features 315 as an input for the first iteration. In some embodiments, after going through the iterative routine 320 once, the relevance parameter determining routine 320 may take as an input the selected-sub-set of features 365. The relevance parameter determining routine 320 may iteratively compute a set of relevance parameters 335, the set of relevance parameters 335 comprising t−1 relevance parameters, t being the pre-defined interaction parameter specifying the number of features to be considered in the computation of the conditional mutual information. At each step j of the relevance parameter determining routine 330, the computation of the current relevance parameter $h_j$ (not depicted) may be based on the previous set of relevance parameters (not depicted) comprising the relevance parameters $h_1, h_2, \ldots, h_{j-1}$ (not depicted) computed previously for the given not-yet-selected feature. The current relevance parameter $h_j$ may then be added to the set of relevance parameters 335 and the relevance parameter determining routine 330 may go on to compute the next relevance parameter $h_{j+1}$ until there is a total of t–1 relevance parameters in the set of relevance parameters 335.

The relevance parameter (not depicted) is the measure of synergy of a given not-yet-selected feature to a target label conditioned by an already selected feature, which may be expressed as conditional mutual information of the given not-yet-selected feature of the set of binarized features 250 and the pre-assigned target label knowing one or more already-selected features and the set of relevance parameters 335. Each iteration of the relevance parameter $h_j$ in the relevance parameter determining routine 330 may be determined based on:

$$h_j := \mathrm{argmax}\ I(c;b|h_1, \ldots, h_{j-1}, h) \qquad \text{(EQ. 4)}$$

wherein I is a mutual information, wherein c is the pre-assigned target label, wherein b is the given not-yet-selected feature part of the set of binarized features 250 and wherein h is a relevance parameter that may be associated with a relevant feature. In embodiments where a first selected feature has been selected in the first feature determining routine 310, the relevance parameter h may be picked from the selected-sub-set of features 365, and for the first iteration may be the first selected feature that was previously selected during the first feature determining routine 310 and added to the selected-sub-set of features 315. After the first iteration, the relevance parameter h may be associated with a feature having the highest relevance parameter with already selected features in the selected-sub-set of features 365. In some embodiments, the relevance parameter h may be associated with the feature having the highest relevance parameter in the set of binarized features 250. In other embodiments, the relevance parameter h may be associated with the feature having the highest relevance parameter in the set of binarized features 250 and the selected-sub-set of features 365.

The redundancy parameter determining routine 340 may be used to generate a set of redundancy parameters 345 in a greedy manner for each not-yet-selected feature of the set of binarized features 250. A redundant feature may be a feature that contains the same information as another selected feature, and is therefore superfluous for classification to the pre-assigned target label. The redundancy parameter determining routine 340 may take as an input the pre-assigned target label (not depicted), the set of binarized features 250 and the set of relevance parameters 335. In embodiments where a first selected feature was added to the selected-sub-set of features 315, the redundancy parameter determining routine 340 may also take the selected-sub-set of features 315 as an input for the first iteration. In some embodiment, after going through the iterative routine 320 once, the redundancy parameter determining routine 340 may take as an input the selected-sub-set of features 365 and may iteratively compute the set of redundancy parameters 345, the set of redundancy parameters 345 comprising t redundancy parameters, t being the pre-defined interaction parameter specifying the number of features to be considered in the computation of the conditional mutual information. At each step j of the redundancy parameter determining routine 340, the computation of the current redundancy parameter $g_j$ (not depicted) may be based on the previous set of redundancy parameters (not depicted) which may contain all the redundancy parameters $g_1, g_2, \ldots, g_{j-1}$ (not depicted) computed previously and a subset of the relevance parameters $h_1, h_2, \ldots, h_{j-1}$ for the given not-yet-selected feature. The current redundancy parameter may then be added to the set of redundancy parameters 345 and the redundancy parameter determining routine 340 may go on to compute the next redundancy parameter $g_{j-1}$ (not depicted) until there is a total of t redundancy parameters in the set of redundancy parameters 345.

The redundancy parameter (not depicted) is a measure of redundancy of a given not-yet-selected feature to a pre-selected target label conditioned by already selected features, which is expressed as a conditional mutual information of the given not-yet-selected feature of the set of binarized features 250 and the pre-assigned target label knowing one or more already-selected features and the set of relevance parameters 335. Each iteration of the redundancy parameter $g_j$ in the redundancy parameter determining routine 340 may be determined based on:

$$g_j := \mathrm{argmin}\ I(c;b,h_1, \ldots, h_{j-1}|g_1, \ldots, g_{j-1}, g) \qquad \text{(EQ. 5)}$$

where I is the mutual information, where c is the pre-assigned target label, where b is the binarized given not-yet-selected feature of the set of binarized features 250, where $h_1, \ldots, h_{j-1}$ is the subset of the set of relevance parameters 335 and where g is a redundancy parameter associated with a redundant feature. In embodiments where a first selected feature has been selected in the first feature determining routine 310, the redundancy parameter g may be picked from the selected-sub-set of features 365, and for the first iteration may be the first selected feature that was previously selected during the first feature determining routine 310 and added to the selected-sub-set of features 315. After the first iteration, the redundancy parameter h may be associated with a feature having the lowest redundancy parameter in the selected-sub-set of features 365. In some embodiments, the relevance parameter determining routine 320 and the redundancy parameter determining routine 330 may be combined in a single routine.

The feature significance score determining routine 350 may be used to generate a feature significance score for each not-yet-selected feature of the set of binarized features 250. The feature significance score determining routine 350 may compute a feature significance score for each not-yet-selected feature based on the pre-assigned target label, the given not-yet-selected feature, the set of relevance parameters 335 and the set of redundancy parameters 345 of the given not-yet-selected feature. In some embodiments, the feature significance score determining routine 350 may compute a feature significance score for each not-yet-selected feature based on the pre-assigned target label, the given not-yet-selected feature, a sub-set of relevance parameters 335 and a sub-set of redundancy parameters 345 of the given not-yet-selected feature. The feature significance score, also known as a scoring criterion or a general relevance index, is a measure of the classification accuracy of the not-yet-selected feature to the pre-assigned target label, after having considered the synergy and the redundancy of the given not-yet-selected feature with the selected-sub-set of features 315 or the selected-sub-set of features 365. The feature significance score determining routine 350 may be executed after having completed the relevance parameter determining routine 320 and the redundancy parameter determining routine 330 t–1 times and t times respectively for the given not-yet-selected feature. In some embodiments, the feature significance score determining routine 350 may be executed after having completed the relevance parameter determining routine 320 and the redundancy parameter determining routine 330 t–1 times and t times respectively for each not-yet-selected feature of the set of binarized features 250. The feature significance score may be determined based on:

$$J_i[f]:=\max_{b\in B[f]} I(c;b;h_1,\ldots,h_{t-1}|g_1,\ldots,g_t) \quad (EQ.\ 6)$$

wherein $J_i$ is the feature significance score, wherein b is the given not-yet-selected feature, wherein B [f] is the set of binarized features 250, wherein I is the mutual information, wherein c is the pre-assigned target label, wherein $h_1, \ldots, h_{t-1}$ is the set of relevance parameters 335, and wherein $g_1, \ldots, g_{t-1}$ is the set of redundancy parameters 345. The feature significance score determining routine 350 may output a set of feature significance scores 355, representing the feature significance score of each not-yet-selected feature.

The feature picking routine 360 may be used to select the given not-yet-selected feature having the highest value of the feature significance score from the set of feature significance scores 355 computed at the feature significance score determining routine 350. The selected feature (not depicted) selected by the feature picking routine 360 in the set of feature significance scores 355 may be the given not-yet-selected feature having the highest relevance index and the lowest redundancy index. The feature picking routine 360 may analyze each feature significance score of the set of feature significance scores 355 to select the maximal argument of the feature significance score. The highest value of the feature significance score may be determined based on:

$$f_{best}:=\mathrm{argmax}_{f\in F\setminus S} J_i[f] \quad (EQ.\ 7)$$

wherein f is the given not-yet-selected feature and in F\S is a set of not-yet-selected features. The selected feature may then be added to the selected-sub-set of features 365.

The selected-sub-set of features 365 may then go through the iterative routine 320 comprising the relevance parameter determining routine 330, the redundancy parameter determining routine 340, the feature significance score determining routine 350 and the feature picking routine 360 until there are k selected features in the selected-sub-set of features 270.

The feature selection routine 260 may be, in some embodiments, implemented with the following pseudocode:
PSEUDOCODE 1

---

Input:
c- the pre-assigned target label;
F - the plurality of features;
B[f]; f ∈ F; - set of binarized features built on f;
k ∈ N - the number of features to be selected;
t ∈ Z+ - the interaction parameter;
Output: S - the selected-sub-set of features;
// Initialize:
// first selected feature
$f_{best} := \mathrm{argmax}_{f \in F} \max_{b \in B[f]} I(c; b)$;
S := {$f_{best}$}; $S_{bin}$ := B[$f_{best}$];
while |S| < k and |F\S| > 0 do
    for f ∈ |F \ S| do
        for b ∈ B[f] do
            // Search for relevant features
            for j := 1 to t − 1 do
                $h_j := \mathrm{argmax}_{h \in F_{bin} \cup B[f]} I$ (c; b |$h_1$,..., $h_{j-1}$, h);
            end for
            // Search for redundant features
            for j := 1 to t do
                $g_j := \mathrm{argmin}_{g \in S^{bin}} I(c; b, h_1,..., h_{j-1} |g_1, ..., g_{j-1}, g)$;
            end for
        // Calculate the feature significance score;
        $J_i[f] := \max_{b \in B[f]} I(c; b; h_1, ..., h_{t-1} |g_1, ..., g_t)$;
    end for // Select the best candidate feature at the current step
$f_{best} := \mathrm{argmax}_{f \in F \setminus S} J_i[f]$;
S := S ∪ {$f_{best}$}; $S_{bin} := S_{bin} \cup B[f_{best}]$;
end while

---

In other embodiments, the feature selection routine 260 may be implemented with the following pseudocode:
PSEUDOCODE 2

---

Input:
c- the pre-assigned target label;
F - the plurality of features;
B[f]; f ∈ F; - set of binarized features built on f;
k ∈ N - the number of features to be selected;
t ∈ Z+ - the interaction parameter;
Output: S - the selected-sub-set of features;
// Initialize:
$F_{bin} = \cup_{h \in F_{bin}} B[f]$
// There is no first selected freature selection
while |S| < k and |F\S| > 0 do
    for f ∈ |F \ S| do
        for b ∈ B[f] do
            // Search for relevant features
            for j := 1 to t − 1 do
                $h_j := \mathrm{argmax}_{h \in F_{bin}} I$ (c; b |$h_1$,..., $h_{j-1}$, h);
            end for
            // Search for redundant features
            for j := 1 to t do
                $g_j := \mathrm{argmin}_{g \in S^{bin}} I(c; b, h_1,..., h_{j-1} |g_1, ..., g_{j-1}, g)$;
            end for
        end for
        // Calculate the feature significance score;
        $J_i[f] := \max_{b \in B[f]} I(c; b; h_1, ..., h_{t-1} |g_1, ..., g_t)$;
    end for
// Select the best candidate feature at the current step
$f_{best} := \mathrm{argmax}_{f \in F \setminus S} J_i[f]$;
S := S ∪ {$f_{best}$}; $S_{bin} := \cup B[f_{best}]$;
end while

---

In other embodiments, the feature selection routine 260 may be implemented with the following pseudo code:
PSEUDOCODE 3

---

Figure 4A:
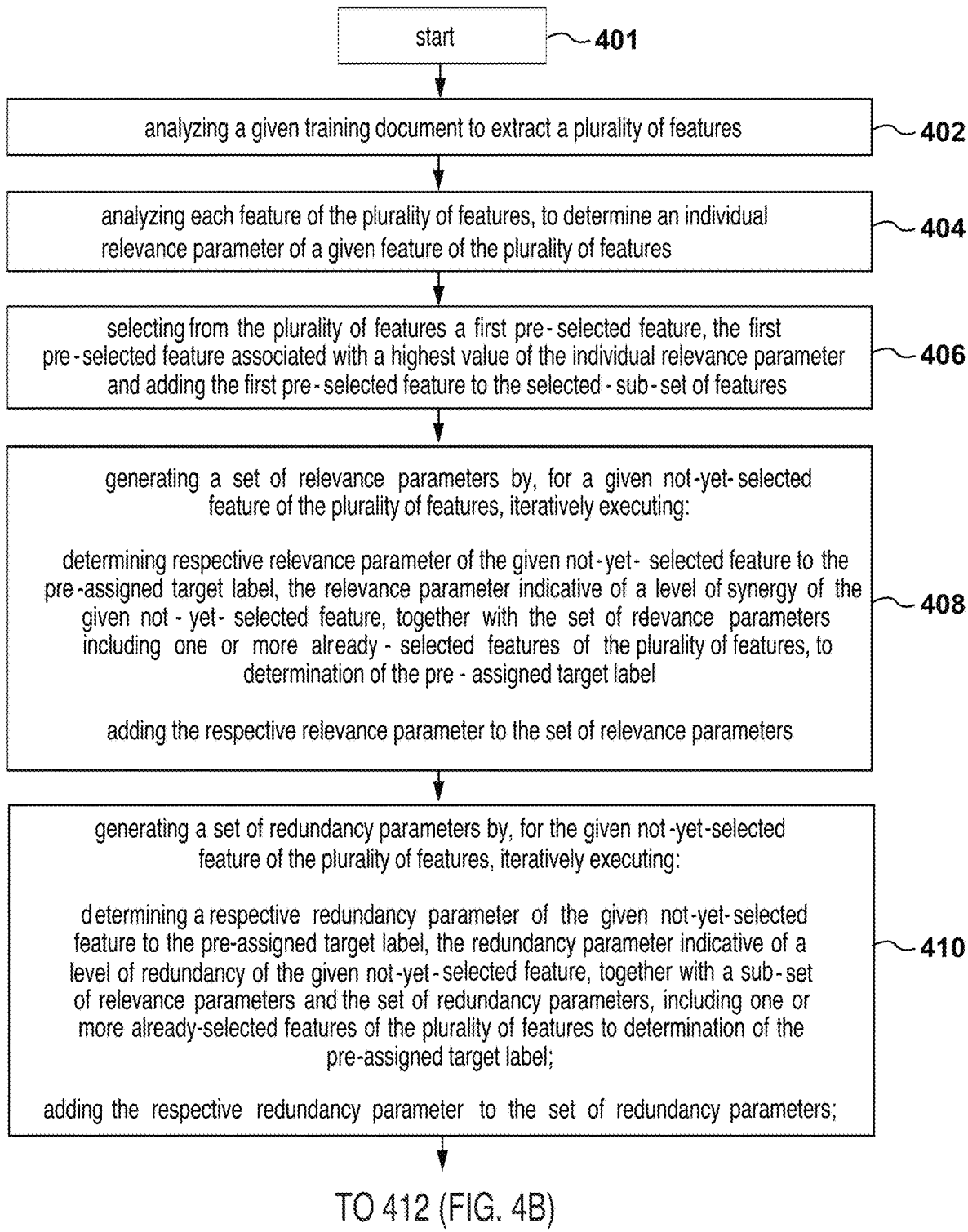
FIG. 4A and FIG. 4B depict a flow chart of a method for selecting a selected-sub-set of features from a plurality of features, the method being executable by the electronic device of FIG. 1, the method being executed in accordance with non-limiting embodiments of the present technology.
Figure 4B:
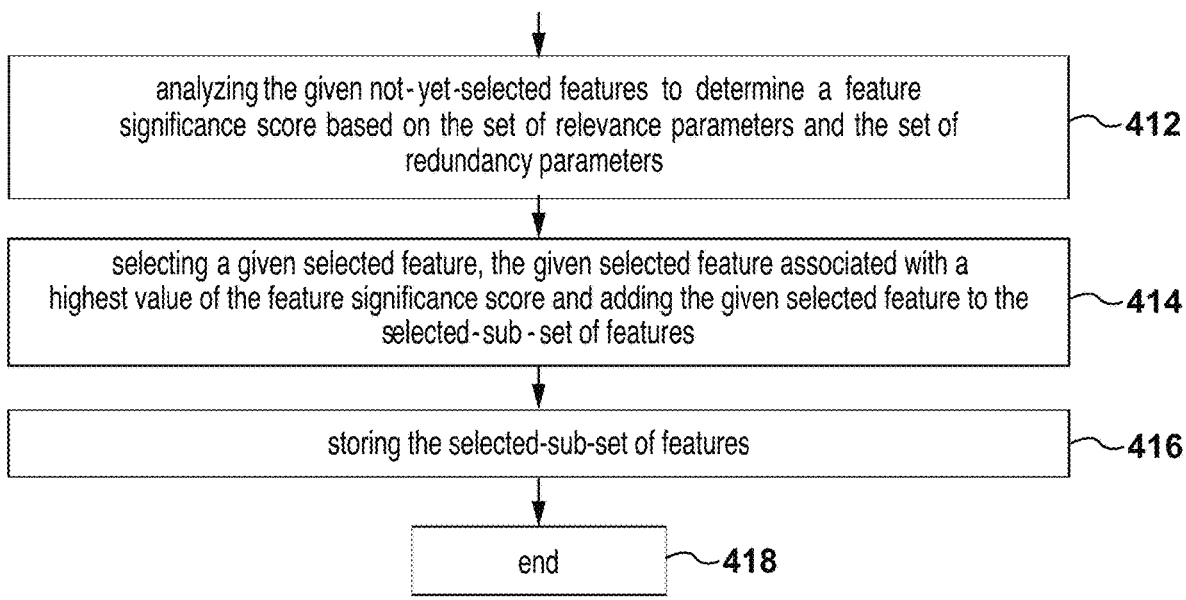

Input:
c- the pre-assigned target label;
F - the plurality of features;
B[f]; f ∈ F; - set of binarized features built on f;
k ∈ N - the number of features to be selected;
t ∈ Z+ - the interaction parameter;
Output: S - the selected-sub-set of features;
// Initialize:
$F_{bin} = \cup_{h \in F_{bin}} B[f]$
// There is no first selected feature selection
while |S| < k and |F\S| > 0 do
    for f ∈ |F \ S| do
        for b ∈ B[f] do
            // Search for relevant features
            for j := 1 to t − 1 do
                $h_j := \mathrm{argmax}_{h \in F_{bin}} I$ (c; b |$h_1$,..., $h_{j-1}$, h);
            end for
            // Search for redundant features
            for j := 1 to t do
                $g_j := \mathrm{argmin}_{g \in S^{bin}} I(c; b, h_1,..., h_{j-1} |g_1, ..., g_{j-1}, g)$;
            end for
        end for
        // Calculate the feature significance score of the feature;
        $J_i[f] := \max_{b \in B[f]} I(c; b; h_1, ..., h_{t-1} |g_1, ..., g_t)$;
    end for
// Select the best candidate feature at the current step
S := S ∪ {$f_{best}$} ∪ {relevant features};
$S_{bin} := S_{bin} \cup B[f_{best}] \cup \{h_1,..., h_{t-1}\}$;
end while Reference is now made to FIG. 4A and FIG. 4B, wherein a computer-implemented method 400 for selecting a selected-sub-set of features from a set of features for training a machine learning algorithm module, the machine learning algorithm module executable by the electronic device 100 is depicted in the form of a flow-chart diagram in accordance with embodiments of the current technology.

The method 400 may begin at a step 401.

STEP 402: analyzing a given training document to extract a plurality of features associated therewith, the given training document having a pre-assigned target label At a step 402, the electronic device 100 may execute the feature acquisition routine 220 to analyze a training document 210 to extract a plurality of features 230 associated therewith, the training document 210 having a pre-assigned target label. The training document 210 may go through the feature acquisition routine 220 to extract the plurality of features 230. As stated previously, the training document 210 may be any form of data or media, and may have features that were previously classified to a target label. In some embodiments, the training document 210 may have features that are pre-filtered. In some embodiments, the plurality of features 230 may go through the binarization routine 240, which may output the set of binarized features 250, as explained above. The method 400 may then advance to step 404. In embodiments where a first selected feature is not determined, the method 400 may advance directly from step 402 to step 408.

STEP 404: analyzing each feature of the plurality of features, to determine an individual relevance parameter of a given feature of the plurality of features to the pre-assigned target label, the individual relevance parameter indicative of a degree of relevancy of the given feature to the determination of the pre-assigned target label At a step 404, the electronic device 100 may execute the first feature determining routine 310 to analyze each feature of the set of binarized features 250, to determine an individual relevance parameter of a given feature of the plurality of features to the pre-assigned target label, the individual relevance parameter indicative of a degree of relevancy of the given feature to the determination of the pre-assigned target label. As stated previously, the individual relevance parameter may be the mutual information. The method 404 may then advance to step 406.

STEP 406: selecting from the plurality of features a first selected feature, the first selected feature associated with a highest value of the individual relevance parameter and adding the first selected feature to the selected-sub-set of features At a step 406, after having analyzed each feature of the set of binarized features 250 with the first feature determining routine 310 to determine an individual relevance parameter, the electronic device 100 may select, by executing the first feature determining routine 310, from the set of binarized features 250, a first selected feature, the first selected feature associated with a highest value of the individual relevance parameter, and may then add the first selected feature to the selected-sub-set of features 315. The highest value of the individual relevance parameter may be the maximum argument of the maximum of the mutual information. The method 400 may then advance to step 408.

STEP 408: generating a set of relevance parameters by, for a given not-yet-selected feature of the plurality of features, iteratively executing:
determining a respective relevance parameter of the given not-yet-selected feature to the pre-assigned target label, the relevance parameter indicative of a level of synergy of the given not-yet-selected feature, together with the set of relevance parameters including one or more already-selected features of the plurality of features, to determination of the pre-assigned target label
adding the respective relevance parameter to the set of relevance parameters At a step 408, the electronic device 100 may execute the relevance parameter determining routine 340 to generate a set of relevance parameters 335 for a given not-yet-selected feature of the set of binarized features 250 by iteratively executing: determining a respective relevance parameter of the given not-yet-selected feature to the pre-assigned target label, the relevance parameter indicative of a level of synergy of the given not-yet-selected feature, together with the set of relevance parameters 335 including one or more already-selected features of the set of binarized features 250, to determination of the pre-assigned target label and adding, by the electronic device 100, the respective relevance parameter to the set of relevance parameters 335. Step 408 may be executed by the electronic device 100 to find a predetermined number of t−1 relevance parameters in the set of relevance parameters 335 representing not-yet-selected features that are complementary to the selected-sub-set of features 315 or the selected sub-set of features 365. The electronic device 100 may determine the relevance parameter of the given not-yet-selected feature by computing the conditional mutual information of the given not-yet-selected feature of the set of binarized features 250 with the pre-assigned target label conditioned by the set of relevance parameters 335 and the selected-sub-set of features 315 or the selected-sub-set of features 365. The electronic device 100 may then add the current relevance parameter to the set of relevance parameters 335, and repeat the operation until there are t−1 relevance parameters in the set of relevance parameters 335. The electronic device 100 may then store the set of relevance parameters 335 in its memory and the method 400 may advance to step 410. In some embodiments, step 408 and 410 may be executed at the same time, iteratively.

STEP 410: generating a set of redundancy parameters by, for the given not-yet-selected feature of the plurality of features, iteratively executing:
determining, by the electronic device, a respective redundancy parameter of the given not-yet-selected feature to the pre-assigned target label, the redundancy parameter indicative of a level of redundancy of the given not-yet-selected feature, together with a sub-set of relevance parameters and the set of redundancy parameters, including one or more already-selected features of the plurality of features to determination of the pre-assigned target label;
adding, by the electronic device, the respective redundancy parameter to the set of redundancy parameters;

At a step 410, the electronic device 100 may execute the redundancy parameter determining routine 340 to generate a set of redundancy parameters 345 for a given not-yet-selected feature of the set of binarized features 250 by iteratively executing: determining a respective redundancy parameter of the given not-yet-selected feature to the pre-assigned target label, the redundancy parameter indicative of a level of redundancy of the given not-yet-selected feature, together with a sub-set of relevance parameters (not depicted) and the set of redundancy parameters 345, including one or more already-selected features of the set of binarized features 250 to determination of the pre-assigned target label and adding, by the electronic device 100, the respective redundancy parameter to the set of redundancy parameters 345. Step 410 may be executed by the electronic device 100 to find a predetermined number of t redundancy parameters representing not-yet-selected features that are redundant to the selected-sub-set of features 315 or the selected-sub-set of features 365. The electronic device 100 may determine the current redundancy parameter of the given not-yet-selected feature by computing the conditional mutual information of the given not-yet-selected feature of the set of binarized features 250 with the pre-assigned target label and a sub-set of relevance parameters conditioned by the set of redundancy parameters. The electronic device 100 may then add the current redundancy parameter to the set of redundancy parameters 345, and repeat the operation until there are t redundancy parameters. The electronic device 100 may then store the set of redundancy parameters 345 in its memory. The method 400 may then advance to step 412.

STEP 412: analyzing the given not-yet-selected features to determine a feature significance score based on the set of relevance parameters and the set of redundancy parameters At a step 412, after steps 408 and 410, the electronic device 100 may execute the feature significance determining routine 350 to analyze each of the not-yet-selected of the set of binarized features 250 to determine a feature significance score based on the set of relevance parameters 335 and the set of redundancy parameters 345. In some embodiments, step 412 may be executed directly after steps 408 and 410. In other embodiments, step 412 may be executed after a set of relevance parameters 335 and a set of redundancy parameters 345 has been determined for each not-yet-selected feature. The feature significance scores of each not-yet-selected features may be added to a set of feature significance score 355. The method may then advance to step 414.

STEP 414: selecting, by the electronic device, a given selected feature, the given selected feature associated with a highest value of the feature significance score and adding the given selected feature to the selected-sub-set of features At a step 414, after having analyzed each of the not-yet-selected features to determine a feature significance score based on the set of relevance parameters 335 and the set of redundancy parameters 345 with the feature significance determining routine 350 and having generated the set of significance scores 355, the electronic device 100 may select a given selected feature from the set of feature significance score 355 by executing the feature picking routine 360. The given selected feature may be associated with a highest value of the feature significance score and may be added to the selected-sub-set of features 365. The given selected feature may be the feature having the best level of synergy and lowest level of redundancy with the selected-sub-set of features 315 or 365. The selected feature may then be added to the selected-sub-set of features 365 or 270. The method 400 may then advance to step 416.

STEP 416: storing, by the machine learning module, the selected-sub-set of features At a step 416, the electronic device 100 may store, in its memory, the selected sub-set of features 365. Steps 408-414 may then be repeated for a total of k times, where k is a predetermined number of selected features in the selected-sub-set of features 270. The method 400 may then end at step 417.

As such, the methods and systems implemented in accordance with some non-limiting embodiments of the present technology can be represented as follows, presented in numbered clauses.

CLAUSE 1. A computer-implemented method (400) for selecting a selected-sub-set of features (270) from a plurality of features (230) for training a machine learning module, the machine learning module executable by an electronic device (100), the training of machine learning module to enable classification of an electronic document to a target label, the plurality of features (230) associated with the electronic document, the method (400) executable by the electronic device (100), the method (400) comprising:

analyzing, by the electronic device (100), a given training document (210) to extract the plurality of features (230) associated therewith, the given training document (210) having a pre-assigned target label;

generating a set of relevance parameters (335) by, for a given not-yet-selected feature of the plurality of features (230), iteratively executing:

determining, by the electronic device (100), a respective relevance parameter of the given not-yet-selected feature to the pre-assigned target label, the relevance parameter indicative of a level of synergy of the given not-yet-selected feature, together with the set of relevance parameters (335) including one or more already-selected features of the plurality of features (230), to determination of the pre-assigned target label;

adding, by the electronic device (100), the respective relevance parameter to the set of relevance parameters (335);

generating a set of redundancy parameters (345) by, for the given not-yet-selected feature of the plurality of features (230), iteratively executing:

determining, by the electronic device (100), a respective redundancy parameter of the given not-yet-selected feature to the pre-assigned target label, the redundancy parameter indicative of a level of redundancy of the given not-yet-selected feature, together with a sub-set of relevance parameters (335) and the set of redundancy parameters (345), including one or more already-selected features of the plurality of features (230) to determination of the pre-assigned target label;

adding, by the electronic device (100), the respective redundancy parameter to the set of redundancy parameters (345);

analyzing, by the electronic device (100), the given not-yet-selected feature to determine a feature significance score based on the set of relevance parameters (335) and the set of redundancy parameters (345);

selecting, by the electronic device (100), a given selected feature, the given selected feature associated with a highest value of the feature significance score and adding the given selected feature to the selected-sub-set of features (365, 270); and storing, by the machine learning module, the selected-sub-set of features (365, 270).

CLAUSE 2. The method (400) of clause 1, wherein the method (400) further comprises, after the analyzing, by the electronic device (100), the given training document (210) to extract the plurality of features (230) associated therewith, binarizing the plurality of features (230) and using a set of binarized features (250) as the plurality of features (230).

CLAUSE 3. The method (400) of any of clauses 1 to 2, wherein the selected-sub-set of features comprises a predetermined number of k selected features and wherein the generating the set of relevance parameters (335) iteratively, the generating the set of redundancy parameters (345) iteratively, the analyzing the given not-yet-selected features and selecting the given selected feature is repeated for a total of k times.

CLAUSE 4. The method (400) of any of clauses 1 to 3, wherein the method (400) further comprises, prior to generating the set of relevance parameters (335), determining a parameter t specifying a number of interacting features, and wherein the determining the respective redundancy parameter is iteratively executed for t−1 steps, and wherein the determining the respective redundancy parameters is iteratively executed for t steps.

CLAUSE 5. The method (400) of any of clauses 1 to 4, wherein the parameter t is at least 3.

CLAUSE 6. The method (400) of any of clauses 1 to 5, wherein the respective relevance parameter is determined based on:

$$h_j := \mathrm{argmax}\, I(c;b|h_1, \ldots, h_{j-1}, h)$$

wherein I is a mutual information;
wherein c is the pre-assigned target label; and
wherein b is a binarized given not-yet-selected feature.

CLAUSE 7. The method (400) of any of clauses 1 to 6, wherein the redundancy parameter is determined based on:

$$g_j := \mathrm{argmin}\, I(c;b,h_1, \ldots, h_{j-1}|g_1, \ldots, g_{j-1}, g)$$

wherein I is the mutual information;
wherein c is the pre-assigned target label;
wherein b is the binarized given not-yet-selected feature; and
wherein h is the respective relevance parameter.

CLAUSE 8. The method (400) of any of clauses 1 to 7, wherein the analyzing, by the electronic device (100), the given not-yet-selected feature to determine the feature significance score based on the set of relevance parameters (335) and the set of redundancy parameters (345) is determined based on:

$$J_i[f] := \max_{b \in B[f]} I(c;b;h_1, \ldots, h_{t-1}|g_1, \ldots, g_t)$$

wherein $J_i$ is the feature significance score;
wherein b is the given unselected binarized feature;
wherein B[f] is the set of binarized features (250);
wherein I is the mutual information;
wherein c is the pre-assigned target label;
wherein $h_j$ is the given relevance parameter; and
wherein $g_j$ is the given redundancy parameter.

CLAUSE 9. The method (400) of any of clauses 1 to 8, wherein the given selected feature associated with a highest value of the feature significance score is determined based on:

$$f_{best} := \mathrm{argmax}_{f \in F \setminus S} J_i[f]$$

wherein f is a given feature of the plurality of features (230); and
wherein F\S is a set of not-yet-selected features.

CLAUSE 10. The method (400) of any of clauses 1 to 8, wherein the method (400) further comprises, prior to generating the second set of relevance parameters (335):
analyzing, by the electronic device (100), each feature of the plurality of features (230), to determine an individual relevance parameter of a given feature of the plurality of features (230) to the pre-assigned target label, the individual relevance parameter indicative of a degree of relevance of the given feature to the determination of the pre-assigned target label; and
selecting, by the electronic device (100), from the plurality of features (230) a first selected feature, the first selected feature associated with a highest value of the individual relevance parameter and adding the first selected feature to the selected-sub-set of features.

CLAUSE 11. The method (400) of any of clauses 1 to 9, wherein the selected feature associated with the highest value of the individual relevance parameter is determined based on $$f_{best} := \mathrm{argmax}_{f \in F} \max_{b \in B[f]} I(c;b)$$

wherein f is the given feature of the plurality of features;
wherein F is the plurality of features (230);
wherein I is the mutual information;
wherein c is the pre-assigned target label;
wherein b is a binarized given feature; and
wherein B[f] is the set of binarized features (250).

CLAUSE 12. The method (400) of any of clauses 1 to 8, wherein the generating the respective relevance parameter is further based on the plurality of features (230) and wherein the generating the respective redundancy parameter is based on the selected-sub-set of features.

CLAUSE 13. The method (400), of any of clauses 1 to 12 wherein adding the given selected feature to the selected-sub-set of features (365, 270) comprises adding the set of relevance parameters (335) to the selected-sub-set of features (365, 270).

CLAUSE 14. A server (100) for selecting a selected-sub-set of features from a plurality of features (230) for training a machine learning module, the training of the machine learning module to enable classification of an electronic document to a target label, the plurality of features associated with the electronic document, the server (100) comprising:
a memory storage;
a processor coupled to the memory storage, the processor configured to:
analyze a given training document (210) to extract the plurality of features (230) associated therewith, the given training document (210) having a pre-assigned target label;
generate a set of relevance parameters (335) by, for a given not-yet-selected feature of the plurality of features (230), iteratively executing:
determine a respective relevance parameter of the given not-yet-selected feature to the pre-assigned target label, the relevance parameter indicative of a level of synergy of the given not-yet-selected feature, together with the set of relevance parameters (335) including one or more already-selected features of the plurality of features (230), to determination of the pre-assigned target label;
add the respective relevance parameter to the set of relevance parameters (335);
generate a set of redundancy parameters (345) by, for the given not-yet-selected feature of the plurality of features (230), iteratively executing:
determine a respective redundancy parameter of the given not-yet-selected feature to the pre-assigned target label, the redundancy parameter indicative of a level of redundancy of the given not-yet-selected feature, together with a sub-set of relevance parameters (335) and the set of redundancy parameters (345), including one or more already-selected features of the plurality of features (230) to determination of the pre-assigned target label;

add the respective redundancy parameter to the set of redundancy parameters (345);

analyze the given not-yet-selected feature determine a feature significance score based on the set of relevance parameters (335) and the set of redundancy parameters (345);

select a given selected feature, the given selected feature associated with a highest value of the feature significance score and adding the given selected feature to the selected-sub-set of features; and store, at the memory storage, the selected-sub-set of features (365, 270).

CLAUSE 15. The server (100) of clause 14, wherein the processor is further configured to, after analyzing the given training document (210) to extract a plurality of features (230) associated therewith, the given training document (210) having a pre-assigned target label, binarize the plurality of features (230) and use a set of binarized features (250) as the plurality of features (230).

CLAUSE 16. The server (100) of any of clauses 14 to 15, wherein the selected-sub-set of features comprises a predetermined number of k selected features and wherein the generating the set of relevance parameters (335) iteratively, the generating the set of redundancy parameters (345) iteratively, the analyzing the given not-yet-selected features and selecting the given selected feature is repeated for a total of k times.

CLAUSE 17. The server (100) of any of clauses 14 to 16, wherein the processor is further configured to, prior to generating the set of relevance parameters (335), determine a parameter t specifying a number of interacting features, and wherein the determining the respective redundancy parameter is iteratively executed for t−1 steps, and wherein the determining the respective redundancy parameters is iteratively executed fort steps.

CLAUSE 18. The server (100) of any of clauses 14 to 17, wherein the parameter t is superior to 3.

CLAUSE 19. The server (100) of any of clauses 14 to 18, wherein the respective relevance parameter is determined based on:

$$h_j := \mathrm{argmax}\, I(c; b | h_1, \ldots, h_{j-1}, h)$$

wherein I is a mutual information;
wherein c is the pre-assigned target label; and
wherein b is a binarized given not-yet-selected feature.

CLAUSE 20. The server (100) of any of clauses 14 to 19, wherein the respective redundancy parameter is determined based on:

$$g_j := \mathrm{argmin}\, I(c; b, h_1, \ldots, h_{j-1} | g_1, \ldots, g_{j-1}, g)$$

wherein I is the mutual information;
wherein c is the pre-assigned target label;
wherein b is the binarized given not-yet-selected feature; and
wherein h is the respective relevance parameter.

CLAUSE 21. The server (100) of any of clauses 14 to 20, wherein the analyzing the given not-yet-selected feature to determine the score based on the set of relevance parameters (335) and the set of redundancy parameters (345) is determined based on:

$$J_i[f] := \max_{b \in B[f]} I(c; b, h_1, \ldots, h_{t-1} | g_1, \ldots, g_t)$$

wherein $J_i$ is the score;
wherein b is the binarized given not-yet-selected feature;
wherein B[f] is the set of binarized features (250);
wherein I is the mutual information;
wherein c is the pre-assigned target label;
wherein $h_j$ is the respective relevance parameter; and
wherein $g_j$ is the redundancy parameter.

CLAUSE 22. The server (100) of any of clauses 14 to 21 wherein the second feature associated with a highest value of the set of relevance parameters (335) and the lowest value of the set of redundancy parameters (345) is determined based on:

$$f_{best} := \mathrm{argmax}_{f \in F \setminus S} J_i[f]$$

wherein f is a feature of the plurality of features; and
where in F \ S is the set of not-yet-selected features.

CLAUSE 23. The server (100) of any of clauses 14 to 22, wherein the processor is further configured to, prior to the selecting the second set of relevance parameters (335):

analyze each feature of the plurality of features (230), to determine an individual relevance parameter of a given feature of the plurality of features (230) to the pre-assigned target label, the individual relevance parameter indicative of a degree of relevance of the given feature to the determination of the pre-assigned target label; and select from the plurality of features (230) a first selected feature, the first selected feature associated with a highest value of the individual relevance parameter and adding the first selected feature to the selected-sub-set of features.

CLAUSE 24. The server (100) of any of clauses 14 to 23, wherein the individual relevance parameter is determined based on:

$$f_{best} := \mathrm{argmax}_{f \in F} \max_{b \in B[f]} I(c; b)$$

wherein f is a feature of the plurality of features (230);
wherein F is the plurality of features (230);
wherein I is the mutual information;
wherein c is the pre-assigned target label;
wherein b is the given not-yet-selected feature; and
wherein B[f] is the set of binarized features (250).

CLAUSE 25. The server (100) any of clauses 14 to 23, wherein the generating the respective relevance parameter is further based on the plurality of features and wherein the generating the respective redundancy parameter is based on the selected-sub-set of features.

CLAUSE 26. The server (100), of any of clauses 14 to 12 wherein adding the given selected feature to the selected-sub-set of features (365, 270) comprises adding the set of relevance parameters (335) to the selected-sub-set of features (365, 270).

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for selecting a selected-sub-set of features from a plurality of features for training a machine learning module, the machine learning module executable by an electronic device,
the training of machine learning module to enable classification of an electronic document to a target label,
the plurality of features associated with the electronic document,
the method executable by the electronic device,
the method comprising:
analyzing, by the electronic device, a given training document to extract the plurality of features associated therewith, the given training document having a pre-assigned target label;
generating a set of relevance parameters by iteratively executing, for a given not-yet-selected feature of the plurality of features:
determining, by the electronic device, a respective relevance parameter of the given not-yet-selected feature to the pre-assigned target label, the relevance parameter indicative of a level of synergy of the given not-yet-selected feature, together with the set of relevance parameters including one or more already-selected features of the plurality of features, to determination of the pre-assigned target label, the respective relevance parameter is determined using:

$$h_j := \operatorname{argmax} I(c: b|h_1, \ldots, h_{j-1}, h)$$

wherein I is a mutual information;
wherein c is the pre-assigned target label; and
wherein b is the given not-yet-selected feature;
adding, by the electronic device, the respective relevance parameter to the set of relevance parameters;
generating a set of redundancy parameters by iteratively executing, for the given not-yet-selected feature of the plurality of features:
determining, by the electronic device, a respective redundancy parameter of the given not-yet-selected feature to the pre-assigned target label, the redundancy parameter indicative of a level of redundancy of the given not-yet-selected feature, together with a sub-set of relevance parameters and the set of redundancy parameters, including one or more already-selected features of the plurality of features to determination of the pre-assigned target label;
adding, by the electronic device, the respective redundancy parameter to the set of redundancy parameters;
analyzing, by the electronic device, the given not-yet-selected feature to determine a feature significance score based on the set of relevance parameters and the set of redundancy parameters;
selecting, by the electronic device, a given selected feature, the given selected feature associated with a highest value of the feature significance score and adding the given selected feature to the selected-sub-set of features; and storing, by the machine learning module, the selected-sub-set of features.

2. The method of claim 1, wherein the method further comprises, after the analyzing, by the electronic device, the given training document to extract the plurality of features associated therewith, binarizing the plurality of features and using a set of binarized features as the plurality of features.

3. The method of claim 2, wherein the selected-sub-set of features comprises a pre-determined number of k selected features and wherein the generating the set of relevance parameters iteratively, the generating the set of redundancy parameters iteratively, the analyzing the given not-yet-selected features and selecting the given selected feature are repeated for a total of k times.

4. The method of claim 3, wherein the method further comprises, prior to generating the set of relevance parameters, determining a parameter t specifying a number of features taken into account in the set of relevance parameters, and wherein the determining the respective relevance parameter is iteratively executed for t−1 steps, and wherein the determining the respective redundancy parameters is iteratively executed for t steps.

5. The method of claim 4, wherein the parameter t is at least 3.

6. The method of claim 1, wherein the respective redundancy parameter is determined using:

$$g_j := \operatorname{argmin} I(c;b,h_1, \ldots, h_{j-1}|g_1, \ldots, g_{j-1}, g)$$

wherein I is the mutual information;
wherein c is the pre-assigned target label;
wherein b is the given not-yet-selected feature; and
wherein $h_1, \ldots h_{j-1}$ is the sub-set of relevance parameters.

7. The method of claim 6, wherein the analyzing, by the electronic device, the given not-yet-selected feature to determine the feature significance score based on the sub-set of relevance parameters and the sub-set of redundancy parameters is determined using:

$$J_i[f] := \max_{b \in B[f]} I(c;b;h_1, \ldots, h_{t-1}|g_1, \ldots, g_t)$$

wherein $J_i$ is the feature significance score;
wherein b is the given unselected binarized feature;
wherein B[f] is the set of binarized features;
wherein I is the mutual information;
wherein c is the pre-assigned target label;
wherein $h_1, \ldots, h_{t-1}$ is the set of relevance parameters; and
wherein $g_1, \ldots, g_t$ is the set of redundancy parameters.

8. The method of claim 7, wherein the given selected feature associated with a highest value of the feature significance score is determined using:

$$f_{best} := \operatorname{argmax}_{f \in F \setminus S} J_i[f]$$

wherein f is a given selected feature of the plurality of features; and
wherein F\S is a set of not-yet-selected features.

9. The method of claim 8, wherein the method further comprises, prior to generating the second set of relevance parameters:
analyzing, by the electronic device, each feature of the plurality of features, to determine an individual relevance parameter of a given feature of the plurality of features to the pre-assigned target label, the individual relevance parameter indicative of a degree of relevance of the given feature to the determination of the pre-assigned target label; and
selecting, by the electronic device, from the plurality of features a first selected feature, the first selected feature associated with a highest value of the individual relevance parameter and adding the first selected feature to the selected-sub-set of features.

10. The method of claim 9, wherein the individual relevance parameter is determined using:

$$f_{best} := \mathrm{argmax}_{f \in F} \max_{b \in B[f]} I(c; b)$$

wherein f is the given feature of the plurality of features;
wherein F is the plurality of features;
wherein I is the mutual information;
wherein c is the pre-assigned target label;
wherein b is the given feature; and
wherein B[f] is the set of binarized features.

11. The method of claim 8, wherein the generating the respective relevance parameter is further based on the plurality of features and wherein the generating the respective redundancy parameter is based on the selected-sub-set of features.

12. The method of claim 11, wherein adding the given selected feature to the selected-sub-set of features comprises adding the set of relevance parameters to the selected-sub-set of features.

13. A server for selecting a selected-sub-set of features from a plurality of features for training a machine learning module, the training of the machine learning module to enable classification of an electronic document to a target label, the plurality of features associated with the electronic document, the server comprising:
   a memory storage;
   a processor coupled to the memory storage, the processor configured to:
   analyze a given training document to extract the plurality of features associated therewith, the given training document having a pre-assigned target label;
   generate a set of relevance parameters by iteratively executing, for a given not-yet-selected feature of the plurality of features:
      determine a respective relevance parameter of the given not-yet-selected feature to the pre-assigned target label, the relevance parameter indicative of a level of synergy of the given not-yet-selected feature, together with the set of relevance parameters including one or more already-selected features of the plurality of features, to determination of the pre-assigned target label, the respective relevance parameter is determined using:

$$h_h := \mathrm{argmax}\, I(c: b|h_1, \ldots, h_{j-1}, h)$$

wherein I is a mutual information;
      wherein c is the pre-assigned target label; and
      wherein b is the given not-yet-selected feature add the respective relevance parameter to the set of relevance parameters;
   generate a set of redundancy parameters by iteratively executing, for the given not-yet-selected feature of the plurality of features:
      determine a respective redundancy parameter of the given not-yet-selected feature to the pre-assigned target label, the redundancy parameter indicative of a level of redundancy of the given not-yet-selected feature, together with a sub-set of relevance parameters and the set of redundancy parameters, including one or more already-selected features of the plurality of features to determination of the pre-assigned target label;
      add the respective redundancy parameter to the set of redundancy parameters;
      analyze the given not-yet-selected feature determine a feature significance score based on the set of relevance parameters and the set of redundancy parameters;
      select a given selected feature, the given selected feature associated with a highest value of the feature significance score and adding the given selected feature to the selected-sub-set of features; and
      store, at the memory storage, the selected-sub-set of features.

14. The server of claim 13, wherein the processor is further configured to, after analyzing the given training document to extract a plurality of features associated therewith, the given training document having a pre-assigned target label, binarize the plurality of features and use a set of binarized features as the plurality of features.

15. The server of claim 14, wherein the selected-sub-set of features comprises a pre-determined number of k selected features and wherein the generating the set of relevance parameters iteratively, the generating the set of redundancy parameters iteratively, the analyzing the given not-yet-selected features and selecting the the given selected feature are repeated for a total of k times.

16. The server of claim 15, wherein the processor is further configured to, prior to generating the set of relevance parameters, determine a parameter t specifying a number of features taken into account in the set of relevance parameters, and wherein the determining the respective relevance parameter is iteratively executed for t−1 steps, and wherein the determining the respective redundancy parameters is iteratively executed for t steps.

17. The server of claim 16, wherein the parameter t is superior to 3.

18. The server of claim 13, wherein the respective redundancy parameter is determined using:

$$g_j := \mathrm{argmin}\, I(c; b, h_1, \ldots, h_{j-1}, g_1, \ldots, g_{j-1}, g),$$

wherein I is the mutual information;
wherein c is the pre-assigned target label;
wherein b is the binarized given not-yet-selected feature; and
wherein $h_1, \ldots, h_{j-1}$ is the sub-set of relevance parameters.

* * * * *